(12) United States Patent
Church

(10) Patent No.: US 8,267,436 B2
(45) Date of Patent: *Sep. 18, 2012

(54) ARROW-SHAPED THREAD FORM FOR TUBULAR CONNECTIONS

(75) Inventor: Kris L. Church, Montgomery, TX (US)

(73) Assignee: Gandy Technologies Corporation, Conroe, TX (US)

( * ) Notice: Subject to any disclaimer, the term of this patent is extended or adjusted under 35 U.S.C. 154(b) by 23 days.

This patent is subject to a terminal disclaimer.

(21) Appl. No.: 12/827,403

(22) Filed: Jun. 30, 2010

(65) Prior Publication Data

US 2011/0012349 A1   Jan. 20, 2011

Related U.S. Application Data

(60) Provisional application No. 61/223,874, filed on Jul. 8, 2009.

(51) Int. Cl.
*F16L 15/00* (2006.01)
(52) U.S. Cl. ............................................. 285/334
(58) Field of Classification Search ............... 285/333, 285/334
See application file for complete search history.

(56) References Cited

U.S. PATENT DOCUMENTS

| | | | |
|---|---|---|---|
| 4,600,224 A | 7/1986 | Blose | |
| 6,254,146 B1 | 7/2001 | Church | |
| 6,722,706 B2 | 4/2004 | Church | |
| 6,832,789 B2 | 12/2004 | Church | |
| 7,588,269 B2 * | 9/2009 | Church | 285/334 |
| 7,690,697 B2 * | 4/2010 | Church | 285/334 |
| 2008/0073909 A1 | 3/2008 | Church | |
| 2008/0277933 A1 | 11/2008 | Church | |

* cited by examiner

*Primary Examiner* — David E Bochna
(74) *Attorney, Agent, or Firm* — Charles D. Gunter, Jr.

(57) ABSTRACT

A thread form is shown which is used to make a threaded pipe connection capable of being screwed together and subsequently unscrewed. A pin member has external threads with stab flanks and load flanks and flat crests and roots for mating with the mating internal threads of a box member to make up a pipe connection. The stab flanks and load flanks form a distinct geometric profile which is arrow-shaped when viewed in profile. The arrow profile can be cut in either of two opposite directions. Each profile includes only two facets with the facets on the stab flank and the facets on the load flank both leaning in the same direction with respect to the longitudinal axis of the pipe, when viewed in profile.

9 Claims, 3 Drawing Sheets

ARROW-SHAPED THREAD FORM FOR TUBULAR CONNECTIONS

CROSS-REFERENCE TO RELATED APPLICATION

The present application claims priority from Provisional Application Ser. No. 61/223,874, filed Jul. 8, 2009, entitled "Arrow-Shaped Thread Form for Tubular Connections," by the same inventor.

BACKGROUND OF THE INVENTION

1. Field of the Invention

The present invention relates to a thread form for threaded connections of the type used for securing tubular flow conduits to form a desired continuous flow path.

2. Description of the Prior Art

A variety of threaded connections are known in the prior art for joining tubular flow conduits in an end-to-end relationship to form a continuous flow path for transporting fluid. Typical examples of such flow conduits include casing, expandable casing, tubing, drill pipe and risers for oil, gas, water and waste disposal wells, and in horizontal and trenchless drilling applications. In the case of oil field casing and tubing, it is a common practice to use metal pipes of a definite length, with sections of pipe joined to form a string. The string of pipes effectively creates one lengthier pipe, intended to provide a means to reach the depth at which the reservoirs of gas or oil are found in order for extraction to the surface.

The pipe sections are secured together at their ends by an externally threaded connector, or "pin" that is threadedly received within an internally threaded connector or "box". Each pipe section has a pin on one pipe end and a box at the opposite pipe end. Some pipe has an internally threaded coupling secured to one end of a double pin pipe section to produce the box. The individual pipe sections are frequently referred to as a "pipe joint". Tubing and casing pipe joints are usually 30 ft. in length but can vary in length from 20 ft. to 40 ft. or longer.

The various pipe strings used in constructing a well are usually assembled on the floor of a drilling or workover rig. The pipe string is lengthened and lowered into the well as succeeding pipe joints are added to the string. During this assembly procedure, the pipe joint being added to the string is lowered, pin down or pin up, into an upwardly or downwardly facing box projecting from the drilling rig floor. This procedure is commonly referred to as "stabbing" the pin into the box. After being stabbed, the added pipe joint is rotated to engage the threads of the pin and box, securing the joint to the string. The process is basically reversed in or to disassemble the pipe string. Once free of the box, the removed joint is moved to a storage location.

There have been numerous advances in thread technology of the type under consideration in recent years. For example, Re. Pat. No. 30,647 issued to Blose in 1981 disclosed a tubular connection having a thread form which provided an unusually strong connection while controlling the stress and strain in the connected pin and box members of the connection. The thread form featured mating helical threads which were tapered in thread width in opposite directions to provide wedge-like engagement of the opposing flanks to limit rotational make-up of the connection. The wedge thread, if properly designed, provides high torsional resistance without inducing axial or radial stresses into the tubular connection upon make-up of the joint, making it easier to break out the joints if this becomes necessary. By reducing axial or radial stresses in the threaded connection, a sounder connection is theoretically provided which is able to withstand a greater level of operating stress and strain.

U.S. Pat. No. 4,600,224, issued Jul. 15, 1986 to Blose was a refinement and further improvement to the basic wedge thread concept. In the invention disclosed in the '224 patent, a connection was shown having a "chevron" load flank. Radial make-up of the threaded connection was controlled by the special thread structuring where the radial movement of a thread into a mating thread groove was restricted by a chevron type interfit between two load bearing thread surfaces of the threaded connection instead of relying upon thread width alone.

Re. Pat. No. 34,467 issued Dec. 7, 1992 to Reeves purported to be an improvement to the basic Blose wedge thread design. As explained by the patentee, when Blose's connection is rotatably made up to engage both the front and back thread load flanks, incompressible thread lubricant or other liquid may be trapped between the engaged load flanks. This trapped thread lubricant can resist the make-up torque and give a false torque indication that results in lower than desired stress and strain being induced in the Blose connection and reducing the design strength and load carrying capacity. The invention described in Re. Pat. No. 34,467 purports to preclude the possibility of false indication of torque by excluding thread lubricant from between the thread load flanks that are brought into engagement at make-up.

In Re. Pat. No. 30,647 and Re. Pat. No. 34,467, the preferred threads were "dovetailed-shaped" in cross section, being wider at the crests than at the roots. U.S. Pat. No. 4,600,224 was a departure from the Blose design in that a semi-dovetail or partial dovetail thread was disclosed. However, the thread crest width continued to be greater than the thread root width as in the traditional definition of the term "dovetail."

U.S. Pat. Nos. 6,254,146 and 6,722,706, to Kris L. Church, were directed to further improvements in thread forms of the type under consideration. The thread forms shown in these earlier Church patents include a special thread structuring where the radial movement of one thread into a mating thread groove is controlled by a complex profile interfit between the two mating thread surfaces of the threaded connection. The complex profile can be present on the stab flank, on the load flank, or on a combination of the two flanks. A controlled clearance is provided between the mating crests of the interengaged threads to prevent hydraulic pressure buildup caused by entrapped lubricant between the thread crests and roots. The stab flanks complex profile is preferably a multi-faceted flank having at least three facets and four radii per stab flank. The pin thread crests have a crest width and the pin roots have a root width. The width of the crest is less than the width of the roots, which is exactly opposite that of the general dovetail design.

Despite the improvements in thread form design discussed above, a need continues to exist for a thread form which is capable of coupling tubular pipe sections quickly and efficiently, which forms a secure connection, and which is economical to produce.

A need also exists for such a thread form which provides a more versatile design than existing designs and which achieves different purposes depending on the end application, such as providing improved tensile load capabilities.

A need also exists for such a thread form which is extremely easy to machine versus other known thread forms in the industry and whose geometry affords easy quality inspection by either mechanical or electronic methods.

A need also exists for such a thread form design which can be configured as a "wedge" in order to provide enhanced bending capabilities for the associated string of pipe.

A need exists for such a thread form which can be used for expanded tubular applications.

A need also exists for such a thread form which can be machined in either of two opposite directions depending upon the anticipated applied loads.

SUMMARY OF THE INVENTION

The present invention has as its object to provide a further modification of the basic thread forms discussed above which provides improved design characteristics and performance over the prior art.

The thread forms of the invention can be used for making a threaded pipe connection capable of being screwed together and subsequently unscrewed. The thread forms are used on a connection which includes a pin having external threads with stab flanks and load flanks and flat crests and roots for mating with the mating internal threads of a box to make up a pipe connection. The thread forms of the invention have a specially designed profile interfit between the two mating thread surfaces of the threaded connection. This specially designed profile is present on both the stab flank and the load flank of the threads making up the thread form. In the preferred form of the invention, the pin stab flanks and load flanks are each comprised of two facets. The facets on the stab flanks and the corresponding facets on the load flanks of each thread both lean in the same direction in imaginary parallel planes, so that the facets form an arrow-shape when viewed in profile.

The facets which make up the stab flank and load flank each have a defined facet height when measured with respect to the thread roots. The facet heights, when combined together, form the overall flank height for the particular flank under consideration. In one version of the thread form of the invention, the facet heights are approximately equal. However, in other versions of the thread form, the facet heights may differ. For example, the facet height of one of the stab or load flank facets adjacent the thread roots can be greater than the remaining facet heights of the particular thread. The preferred thread forms can be formed with a negatively sloped facet which forms a hook at the base of the load flank to provide tensile load capabilities only afforded by a negative load flank angle thread form. In one preferred form of the invention, where the threads have a given thread height defined between the thread crests and thread roots, and wherein the thread crests and the thread roots have a given width, the width at or near the thread crests is less than the width of the thread measured at the thread roots. The thread form of the invention can be provided with tapered threads having a given angle of taper with respect to a longitudinal axis of the pipe. Alternatively, the thread form can be provided with parallel threads where thread roots and crests are parallel to the longitudinal axis of the pipe. The thread form can also be provided with threads which are helically structured as a wedge.

The threads of the invention can be used to form a secure tubular connection which can be used with a tubular selected from the group consisting of oil, gas, construction, water and waste disposal well casing and tubing.

Additional objects, features and advantages will be apparent in the written description which follows.

DETAILED DESCRIPTION OF THE INVENTION

Figure 1:
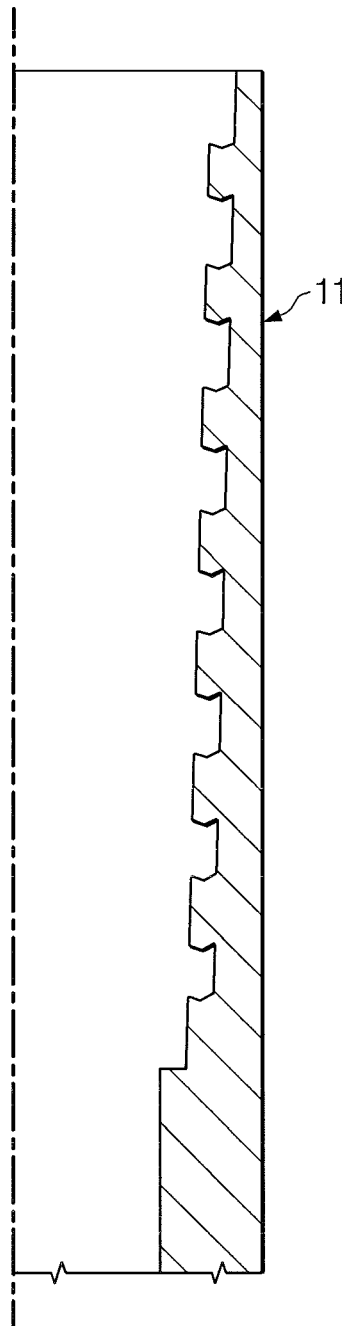
FIG. 1 is a partial, quarter-sectional view of the box end of a section of pipe employing the thread form of the invention.
Figure 2:
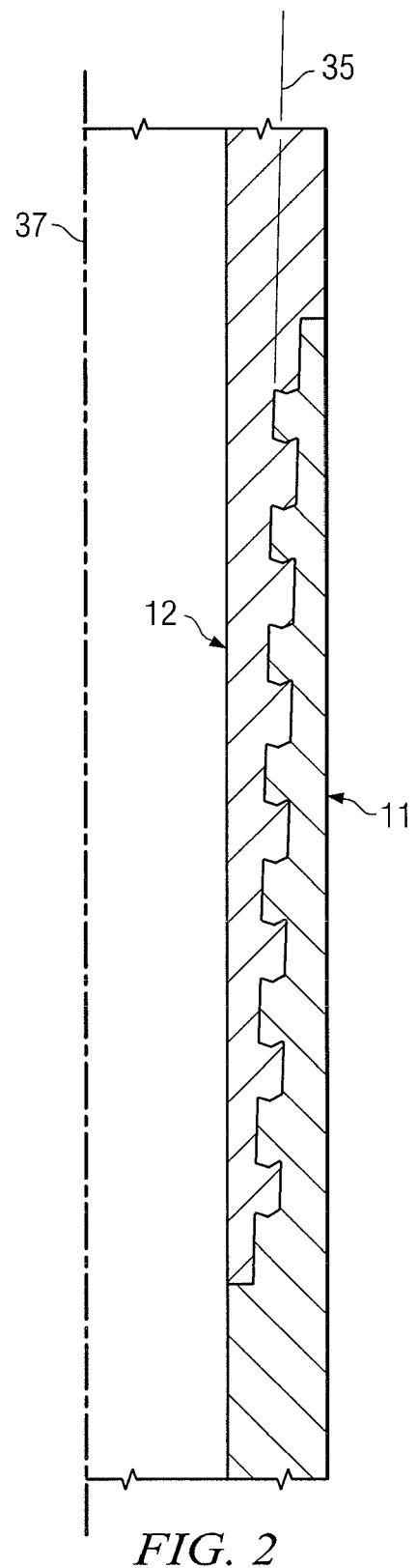
FIG. 2 is another quarter-sectional view of the thread form of the invention being used on a box and pin member to form a threaded connection.

Turning to FIG. 1 of the drawings, there is shown a quarter, cross-sectional view of a box end of a section of tubular pipe, such as a section of oil field casing, employing the thread form of the invention, the section of pipe being designed generally as 11. FIG. 2 of the drawings is a similar quarter, cross-sectional view, but showing the box end 11 being made up with a mating pin end 12 to form the threaded pipe connection. As has been discussed, the thread forms of the invention can also be applied to a wide variety of tubular goods. Typical applications could include, but are not limited to, oil and gas offshore and onshore sub surface casing, intermediate casing, production casing, expandable casing, work over tubing, production tubing, tiebacks, risers, pile driving casing, line pipe, drill pipe, TNT pipe, flush joints, HDD pipe, water well pipe, liners for constructions, mining pipe, and disposal wells. Also, those skilled in the art will understand that the thread forms of the invention can be used in a variety of known types of pipe connections, including connections which are swaged, expanded, upset or non-upset and can be tapered or "cylindrical", non-tapered connections. The thread forms of the invention can also be used in connections which are helically structured as wedge threads such as those described in Blose Re. Pat. No. 30,647 and Reeves Re. Pat. No. 34,467.

Figure 3:
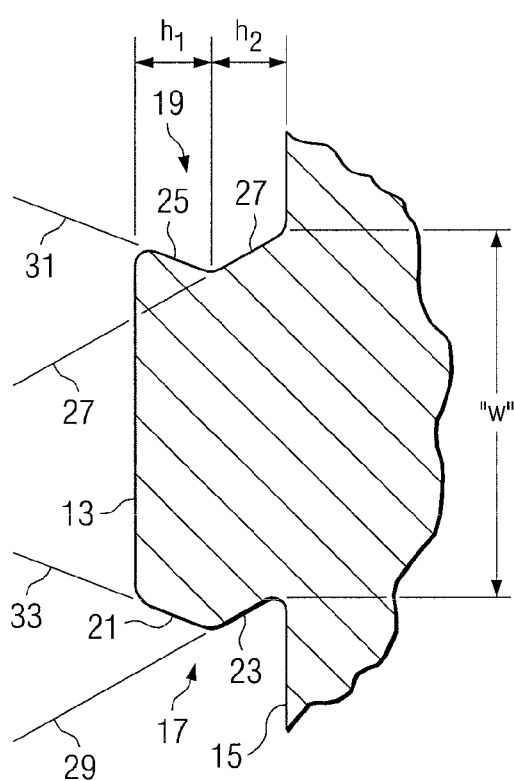
FIG. 3 is an isolated view of one thread of the box member of FIG. 1, showing the relative geometry thereof.

FIG. 3 shows one isolated thread from the box end of FIG. 1 in section and in greater detail. As has been mentioned, the box end 11 of the tubular member has pin threads with thread crests 13 and thread roots 15. The crests 13 and roots 15 of the box member 11 are adapted to be made up with a mating pin member (illustrated as 12 in FIG. 2), having a complimentary thread structure. The pin end is essentially a mirror image of the box end. The box thread crests 13 are formed between a stab flank 17 and a load flank 19 of the pin thread (see FIG. 3). The thread crests 13 are approximately parallel to the thread roots 15.

As used herein, the term "load flank" will be understood to designate that sidewall of a thread that faces away from the outer end from the respective male or female member on which the thread is formed, and the term "stab flank" will be understood to refer to that sidewall surface that faces toward the outer end of the respective male or female member as the connection is made up. With respect to the thread shown in FIG. 1, the box mouth or outer end would be located toward the top of the drawing.

As will be appreciated from FIGS. 1 and 2, the stab flanks 17 and load flanks 19 of the thread form of the invention are each designed to form a specially designed interfit between the two mating thread surfaces of the pin end and box end of the threaded connection. This specially designed profile interfit is present on both the stab flank 17 and the load flank 19 of the threads making up the thread form. In the preferred form of the invention illustrated in FIGS. 1-3, the stab flanks 17 and load flanks 19 are each comprised of only two facets, 21, 23 and 25, 27, respectively. It can also be seen from FIG. 1 that the facets on the stab flanks 17 and the corresponding facets on the load flanks 19 of the thread form both lean in the same direction in imaginary parallel planes (illustrated as 27, 29 and 31, 33), so that the facets form an "arrow-shape" when viewed in profile.

It will be observed, with respect to FIG. 3, that the facet 23 forms a negative angle or "hook" with respect to the thread root 15 and to the horizontal axis of the pipe string (illustrated as 37 in FIG. 2). By "negative" angle is meant that the angle formed between the facet 23 and the adjacent thread root surface 15 is an acute angle whereby the facet 23 flares or leans inwardly toward the thread root 15. In like fashion, the facet 21 forms a positive angle with respect to the surface 15. As will be appreciated with respect to FIG. 3, the facets 21 and 25 are all inclined in the same direction while the facets 23 and 27 are all inclined in the same direction. While in the preferred version of the invention, the facets 21 and 25 are parallel and the facets 23 and 27 are parallel, it will be appreciated that the respective flanks could have facets which are not perfectly parallel, as well, as long as they continue to lean in the same general direction. It should also be noted that the unique profile interfit of the stab and load flanks of the thread form of the invention differs from, for example, a traditional "dovetail" thread. In the traditional dovetail thread, the stab and load flanks flare outwardly in opposite directions from the longitudinal axis of the pipe and from the thread roots. The thread crests of the traditional dovetail are also wider than the width of the thread at the thread roots. In the case of the present thread form illustrated in FIG. 3, however, the width of the thread root "w" is slightly greater than the width of the thread crest 13.

Each of the flanks of the thread form has a given thread height which is made up by the combined height of the two facets on the flank, illustrated as "h1" and "h2" in FIG. 3. In the version of the thread form illustrated in FIG. 3, the height of each thread flank 17, 19 is approximately equal. However, it will be appreciated that, in other versions of the thread form, the facet heights may differ. For example, the facet height of one of the stab or load flank facets adjacent the thread roots can be greater than the remaining facet heights of the particular thread.

As was briefly mentioned, the thread forms of the invention can either be cylindrical threads, or can be tapered threads having a given angle of taper with respect to a longitudinal axis of the pipe. In the engaged connection shown in FIG. 2, the thread crests and roots are on an imaginary axis 35 which is parallel to the longitudinal axis 37 of the pipe.

In some cases, the thread forms of the invention can be helically structured as a wedge. In other words, both the pin and box threads are machined as helical wedge threads and thus have progressively changing axial width along the helical length thereof. In other words, with reference to FIG. 2, the threads on the pin member 12 could be machined so that the thread width of each successive thread progressively decreases from the inner extent of the pin member along the helical length thereof to the outer extent adjacent the mouth of the pin member. The axial thread width of the box member would progressively decrease in the opposite direction. The progressively changing axial width of the pin and box threads provides a wedging interfit to limit axial make-up of the tubular connection. Further details of "wedge" thread forms can be gained from the previously referenced Re. Pat. No. 30,647 issued to Blose in 1981, and similar references which will be familiar to those skilled in the art of thread form design.

FIG. 4 of the drawings illustrates another version of the thread form of the invention, which will be referred to herein as the "reverse arrow-shape profile." The thread form shown in FIG. 4 is again a box member 39 having external threads with stab flanks 41 and load flanks 43 and flat crests 45 and roots 47 for mating with the mating internal threads of a pin to make up a pipe connection. In the form of the invention illustrated in FIG. 4, however, the facets making up the stab flanks 41 and load flanks 43 are each facing exactly oppositely in direction from the facets in the thread form of FIG. 3 so that the thread flanks form a "reverse arrow-shape" in profile. In other words, with reference to FIG. 4, the reverse arrow-shape profile is essentially the opposite or mirror image of the regular arrow-shaped profile which has been discussed up to this point. However, in common with the first form of the invention, the "reverse arrow-shape" profile of FIG. 4 has stab and load flanks which are made up of only two facets, such as the facets 49 and 51. The facets 49 and 51 also lean in different directions, as was true in the cases of facets 21, 23 and 25, 27 in FIG. 3. The thread form of FIG. 4 differs from the regular arrow-shaped profile of FIGS. 1-3 in that the threads are formed with a positively sloped facet 53 at the root of the load flank.

Figure 5:
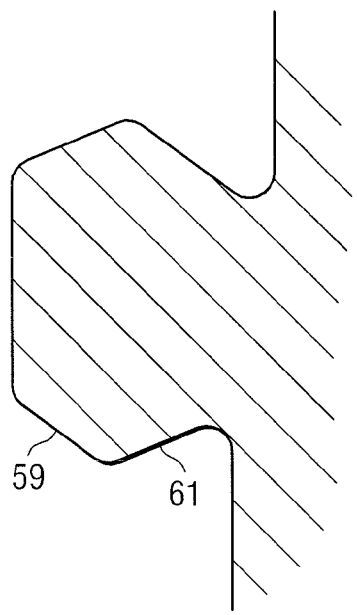
FIGS. 5-8 are simplified, isolated views of alternative thread forms having stab flanks and load flanks each of which is made up of only two facets.
Figure 6:
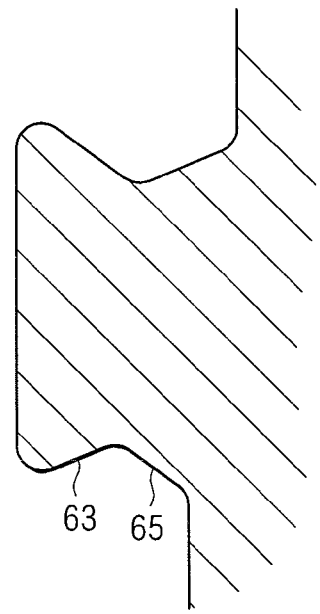
Figure 7:
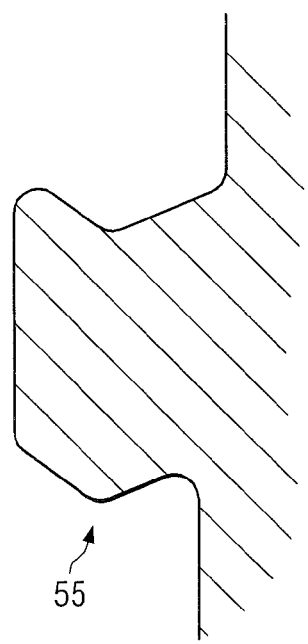
Figure 8:
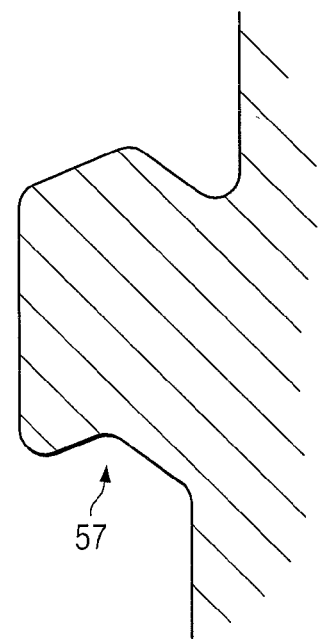

FIGS. 5-8 of the drawings illustrate, in simplified fashion the regular arrow-shaped profile (55 in FIG. 7), the reverse arrow-shaped profile (57 in FIG. 8). FIGS. 5 and 6 illustrate additional thread forms which have the common feature of being comprised of only two facets on each flank, such as facets 59 and 61 in FIG. 5 and facets 63 and 65 in FIG. 6.

Figure 4:
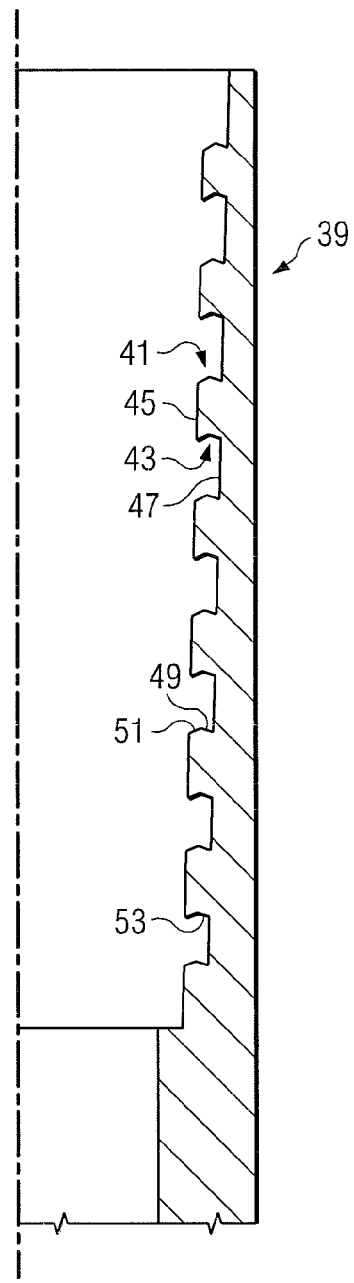
FIG. 4 is a view of another thread form of the invention on a box member, the threads in this case being essentially mirror images of the threads on the box of FIG. 1.

The differing designs illustrated in FIGS. 1 and 4 have different advantages, depending upon the end application. The regular arrow-shape profile illustrated in FIG. 1 provides tensile load capabilities only afforded by a negative load flank angle thread form. The regular arrow-shape profile might be used most advantageously in oil field casing and tubing applications where the pipes are typically in tension. The reverse arrow-shape profile might be used more advantageously in such applications as horizontal or trenchless drilling where the pipe string is being "pushed" and is therefore in compression. In fact one advantage of the thread form of the invention is the fact that it can be machined in either of two opposite directions, depending upon the anticipated applied load.

The arrow-shape profile of the invention also has application for use in the so-called "expanded casing" applications which have come into fairly wide spread use in recent years. Expanded casing is used in some well construction operations where it is found to be advantageous to radially plastically expand threaded pipe or casing joints in a drilled open hole or inside a cased wellbore. In a cased wellbore, radially expandable casing can be used to reinforce worn or damaged casing so as to, for example, increase a burst rating of the old casing, thereby preventing premature abandonment of the hole. In open hole sections of the wellbore, the use of radially expandable casing may reduce a required diameter of a drilled hole for a desired final cased hole diameter, and may also reduce a required volume of cement required to fix the casing in wellbore.

In order to further explain the nature of expandable tubulars, it will be appreciated that in conventional oilfield, water and waste disposal drilling, casing strings are installed at intervals whereby the casing for the next interval is installed through the casing for the previous interval. As a result, the outer diameter of a casing string is limited by the inner diameter of the previously installed casing string. Thus the casing strings in a conventional wellbore are nested relative to each other, with casing diameters decreasing in a downward direction. An annular space is typically provided between each string of casing and the wellbore so that cement may be pumped into the annular space or annulus to seal between the casing and the wellbore.

Because of the nested arrangement of the casing strings in a conventional wellbore, and the annular space required around the casing strings for cement, the hole diameter required at the top of the wellbore is relatively large. This large initial wellbore diameter may lead to increased costs due to the expense of large diameter casing, the expense of drilling large diameter holes, and the added expense of cementing a large casing string. Additionally, the nested arrangement of the casing strings in a conventional wellbore can severely limit the inner diameter of the final casing string at the bottom of the wellbore, which restricts the potential production rate of the well.

Thus, it may be desirable to radially expand a casing string "in situ" after it has been run into the wellbore through the previous casing string, so as to minimize the reduction of inner diameter of the final casing string at the bottom of the wellbore. Radially expanding a casing string in the wellbore has the added benefit of reducing the annular space between the drilled wellbore and the casing string, which reduces the amount of cement required to effect a seal between the casing and the wellbore.

The radial expansion can be achieved by a cold-forming expansion process in which an expansion tool or "pig" is moved through a casing string so as to radially plastically expand the casing string. One common prior-art expansion process uses a conically tapered, cold-forming expansion tool to expand casing in a wellbore. The expansion tool is generally attached to a lower end of a casing string that is run into the wellbore. The expansion tool also includes a cylindrical section having a diameter typically corresponding to a desired expanded inner diameter of a casing string. The cylindrical section is followed by a tapered section. After the casing string is set in place in the hole, an axial upward lifting force is exerted on the working string to force the expansion tool upward through the casing string so as to outwardly radial displace the casing string to a desired expanded diameter.

It will be appreciated from the foregoing that the threadforms utilized in expanded casing operations must be capable of securely joining the casing string and maintaining the integrity of the string so that the expansion operation does not significantly weaken the load carrying capacity of the threaded connection. During the expansion process, axial strains in standard prior art connections can cause the connection to fail. Alternatively, the efficiency of the connection (commonly defined as the ratio of a mechanical property of the pipe body, such as axial tension capacity, to the same mechanical property across the connection) may drop severely after casing expansion. The pipe body wall thickness is also generally reduced during the expansion process, thus reducing the mechanical properties of the pipe body itself. The improved arrow-shaped thread profiles of the invention are well suited for use in expanded casing operations of the type described.

The assembly of a typical connection will be briefly discussed with respect to FIGS. 1 and 2 of the drawings. As has been explained, assembly of the pipe string normally involves a pipe joint being added to the existing string by lowering a section of pipe pin end down, into an upwardly facing box projecting from the drilling rig floor. After being stabbed into position, the added pipe joint is rotated to engage the threads of the pin and box, thereby securing the joint to the pipe string. The connections of the invention are generally freerunning with the respective thread roots and crests, i.e., 13, 15 in FIG. 2, first making contact. Next in the order of assembly, the facet surfaces 21 and 25 make contact with their respective counterparts in the pin end. Finally, the facet surfaces 23 and 27 make contact with their respective counterpart surfaces in the box end of the connection.

An invention has been provided with several advantages. Axial make-up of the threaded connection of the invention can be controlled by properly designing the specially profile interfit of the engagement surfaces of the threads themselves. The thread forms of the invention provide greater versatility in design than did the designs of the prior art. In some forms, the thread form works best in tension. In other forms, the thread form works best in compression. The thread form can be machined with a negative angle load flank, providing improved tensile loading capabilities. The thread form is extremely easy to machine, as compared to thread forms of this general type available in the marketplace. The thread form can be machined as a "wedge" thread to afford enhanced bending capabilities for the associated pipe string. The properties of the thread form of the invention make it ideally suited for expandable tubular applications. The geometry of the thread affords easy quality inspection using either mechanical or electronic methods. The thread form can be machined in either of two oppositely arranged directions, depending upon the anticipated loading of the pipe string.

While the invention has been shown in several of its forms, it is not thus limited, but is susceptibly to various modifications without departing from the spirit thereof.

What is claimed is:

1. A thread form for making a threaded pipe connection capable of being screwed together and subsequently unscrewed, the thread form comprising:
   a pin having external threads with stab flanks and load flanks and flat crests and roots for mating with the mating internal threads of a box to make up a pipe connection, and wherein the stab flanks and load flanks are each comprised of only two facets, and wherein the facets on the stab flanks and the corresponding facets on the load flanks of each thread both lean in the same direction in imaginary parallel planes, so that the facets form an arrow-shape when viewed in profile; and
   wherein the presence of only two facets on each of the respective stab flanks and load flanks and the fact that the respective corresponding facets on the stab and load flanks both lean in the same direction allow the thread form to be machined in either of two opposite directions resulting in thread forms which are exact mirror images of one another, one mirror image thread form being useful for pipe connections where the pipes are in tension and one mirror image thread form being useful for pipe connections where the pipes are in compression.

2. The thread form of claim 1, wherein the threads are formed with a negatively sloped facet which forms a hook at the base of the load flank.

3. The thread form of claim 1, wherein the threads have a given thread height defined between the thread crests and thread roots, wherein the thread crests and the thread roots have a given width, and wherein the width at or near the thread crests is less than the width measured at the thread roots.

4. The thread form of claim 1, wherein the threads are tapered threads having a given angle of taper with respect to a longitudinal axis of the pipe.

5. The thread form of claim 1, wherein the thread roots and crests are parallel to the longitudinal axis of the pipe.

6. The thread form of claim 1, wherein the threads are helically structured as a wedge.

7. The thread form of claim 1, wherein the connection is used with a tubular selected from the group consisting of oil, gas, construction, water and waste disposal well casing and tubing.

8. A make and break threaded pipe connection capable of being screwed together and subsequently unscrewed, the threaded pipe connection comprising:
- a box having internal threads with stab flanks and load flanks and flat roots and crests;
- a mating pin having external threads with stab flanks and load flanks and flat crest and roots for mating with the mating internal threads of the box to make up a pipe connection, and wherein the pin stab flanks and load flanks are each comprised of only two facets, and wherein the facets on the stab flanks and the corresponding facets on the load flanks of each thread on the pin both lean in the same direction in imaginary parallel planes, so that the facets form an arrow-shape when viewed in profile which mates with a corresponding thread profile on the box
- wherein the presence of only two facets on each of the respective stab flanks and load flanks and the fact that the respective corresponding facets on the stab and load flanks both lean in the same direction allow the thread form to be machined in either of two opposite directions resulting in thread forms which are exact mirror images of one another, one mirror image thread form being useful for pipe connections where the pipes are in tension and one mirror image thread form being useful for pipe connections where the pipes are in compression.

9. The make and break threaded connection of claim 8, wherein the connection is used with a tubular selected from the group consisting of casing and tubing for oil, gas, water and waste disposal wells.

* * * * *